Jan. 27, 1931.   E. A. MENNINGER ET AL   1,790,626
CUP FILLING DEVICE
Filed March 7, 1925   2 Sheets-Sheet 1
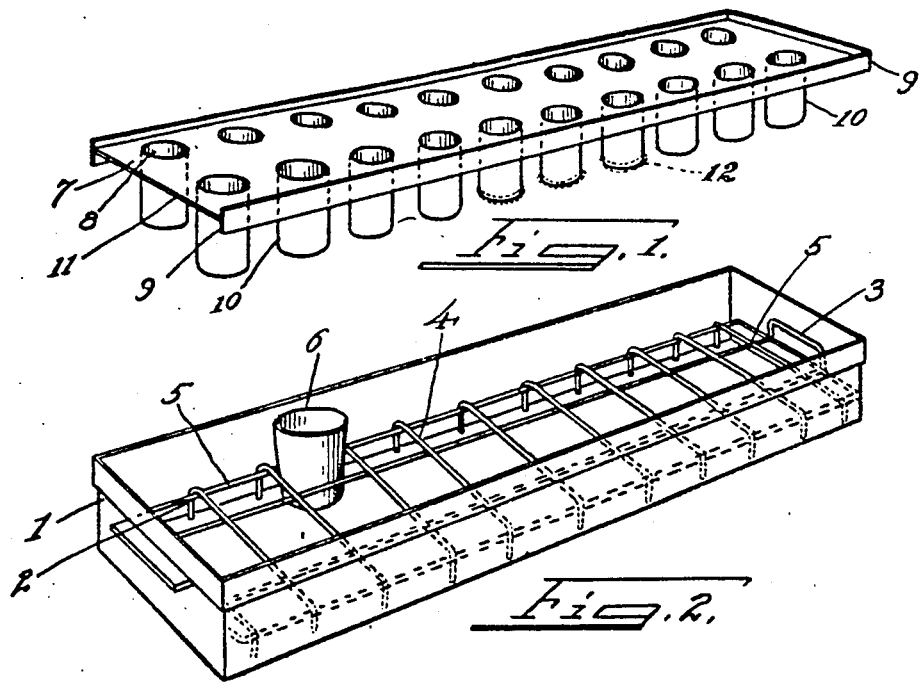
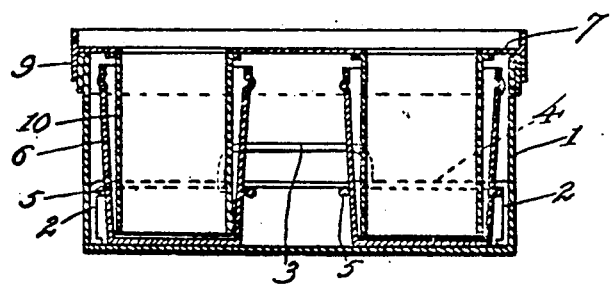
INVENTORS
Edward A. Menninger
Walter B. Thompson
BY
ATTORNEYS.

Jan. 27, 1931.　　E. A. MENNINGER ET AL　　1,790,626
CUP FILLING DEVICE
Filed March 7, 1925　　2 Sheets-Sheet 2
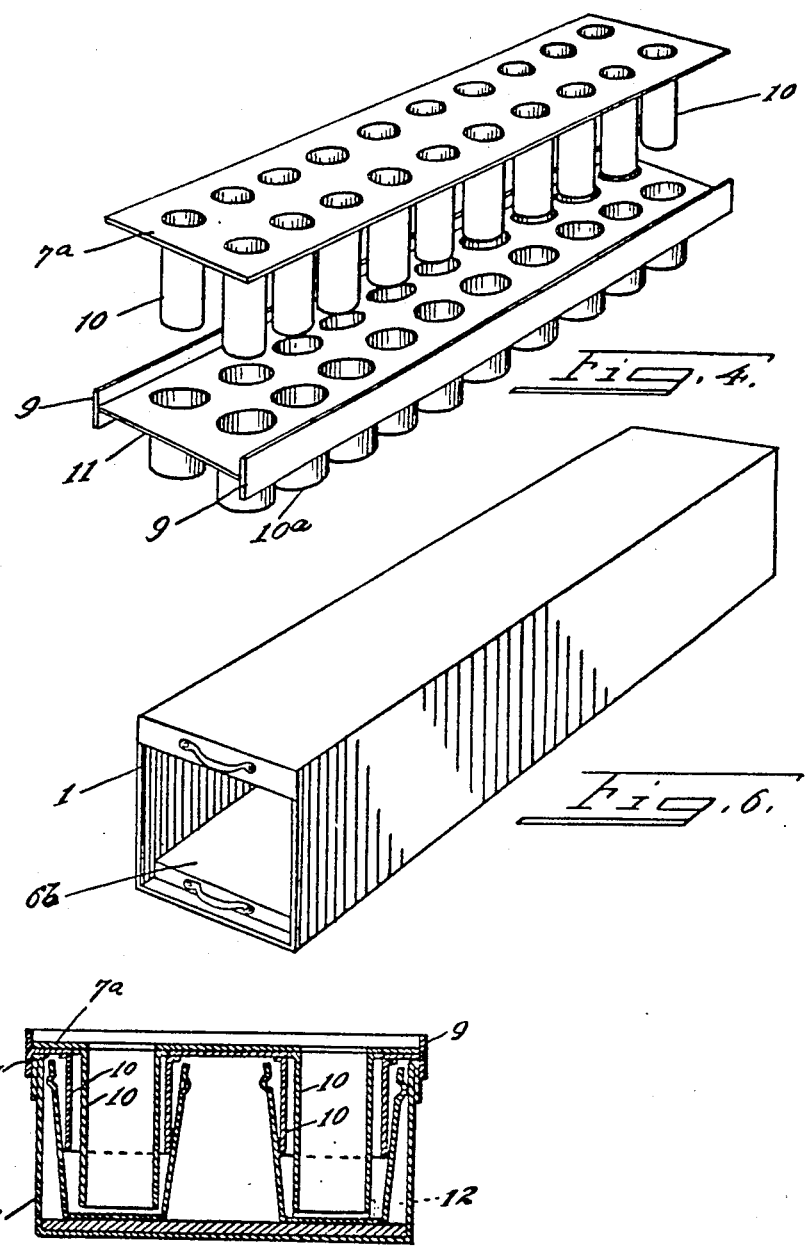

Patented Jan. 27, 1931

1,790,626

UNITED STATES PATENT OFFICE

EDWARD A. MENNINGER AND WALTER R. THOMPSON, OF CINCINNATI, OHIO; SAID MENNINGER ASSIGNOR, BY MESNE ASSIGNMENTS, TO THE TOMPAX MANUFACTURING COMPANY, OF CINCINNATI, OHIO, A CORPORATION OF OHIO

CUP-FILLING DEVICE

Application filed March 7, 1925. Serial No. 13,767.

Our invention relates to devices used more particularly in filling cups with measured quantities of liquid, or measured quantities of food products such as mustard, preserves or condiments. It especially relates to the ice cream industry, in which cups are filled with a given quantity of ice cream, or mixtures of several kinds of ice cream, while in pasty condition of partial congealing, said cups being then placed in a refrigerator to solidify.

There are many expensive machines for filling cups, the particular object of our invention, but these machines are very expensive, and are large and bulky. Also when used for ice cream and it is desired to change the quantity and proportions of ice cream or when it is desired to change the cups for different products, expensive changes are required, in such machines.

Our invention is provided to take the place of expensive mechanisms, while providing for multiple cup filling in a rapid manner, with accurate measurement of quantity in the cups. Our mechanism is a hand device as distinguished from an automatic device, but accomplishes like objects and is well adapted to the ice cream business.

Our structure is applicable for filling all sizes of cups and all kinds of products, but it will be found particularly useful for retail merchants who purchase a small quantity of ice cream or make their own and who then require a convenient device for use in filling cups or cartons.

The objects stated we accomplish by that certain construction and arrangement of parts to be hereinafter more specifically pointed out, described, and the novelty therein duly claimed.

In the drawings:

Figure 1 is a perspective view of a single measuring and filling device.

Figure 2 is a perspective view of the cup pan and one form of cup holding rack.

Figure 3 is a cross section of the device with a single filler pan in use.

Figure 4 is a perspective view showing the use of two filler devices as required to fill a cup with a mixture of ice cream.

Figure 5 is a cross section of the structure with two filling devices in use.

Figure 6 is a modified form of cup holding device in the form of a removable tray.

The container or cup pan is in the form of a box 1, rectangular in shape, although it might be of other convenient shape to correspond with the filler and cup rack or cup tray.

A rack or tray is not a necessary item and can be omitted, although it facilitates handling the filled cups. One form is shown as an open work wire structure, seated in the pan, and having side pieces 2, end handles 3, and raised cross bars 4. The cross bars are soldered to the lengthwise bars 5, which are four in number in the example. The bars 4 and 5 form compartments into each of which cups 6 can be dropped. The rack is arranged so that the tops of the cups (tapered cups of paper being the standard article employed) will not pass through the compartments.

Upon lifting out the rack or sliding in the tray all cups will come with it.

The filling device is formed as a cover 7 for the box, having holes 8, in its upper surface, and flanges 9 to fit over the box. Set into the holes are hollow tubes 10 (here cylinders) soldered into the holes and depending from the lid.

A modification of the rack support shown in Figure 2 is shown in Figure 6 where the box 1 is open at one end and has a tray 6b fitting within the box 1 on which the cups may be placed. The box is not used during the filling but the tray 6b is withdrawn and the filler plates set directly in the cups on the tray without the necessity of using the spacing rack.

For filling with a single filter tray the cups are arranged in the rack, or in rows on the tray or on the floor of the tank, where no rack is employed, and the filling device is such that a tube 10 will pass into each cup.

The tubes 10 have cubic contents of the amount desired to place in each cup. The flange or rim 9 of the filler lid structure is omitted at the end 11, so that the operator can pour ice cream onto the lid, permitting it to fill the tubes or cylinders.

The tubes will approximately touch the bases of the cups so as to form a seal, and the operator scrapes off excess cream at the end 11, after the tubes have been filled. The cream runs into the cups as the filler is lifted, which results in each cup having a measured quantity of the cream.

Even if the tubes do not actually touch the bottoms of the cups, they will still preserve a measuring function, since the cream is thick enough for the bottoms of the cups to fill as the cream is poured on, with the cream sealing the bottoms of the tubes. The tubes can be filled up and the lid lifted to permit the amount therein to drop into the cups.

The operation is rapid, and the lid prevents cream from dropping elsewhere than into the cups, while the rim prevents loss of cream, except at the one end where a vessel will be located to catch it.

In the ice cream industry caps are placed on the cups before the final freezing is done. We find that the rack can be used to carry the cups about when filled, and hold them while caps are set into them. Thus the tank is not idle while the cups are being capped.

For filling cups with different kinds of ice cream a modification of the filling device shown in Figure 1 is preferable. Instead of one filling device or plate two filler plates are used, a top plate 7a in which the filling tubes are of small diameter but of sufficient length to extend to the bottom of the cups. The top plate has the flanges 9 omitted and fits flush between the flanges of a lower filler plate 11 in which the depth of the filling cylinders 10a is only sufficient to extend part way into the cup. Thus in use the two filler plates are placed in position over the cups in the box, with the top plates with the narrow long filling tubes extending within the lower plate with the thicker shorter tubes. The ice cream is spread over the top plate and a quantity of ice cream equal to the solid contents of the tube is filled in each tube. When the top plate is removed this measured quantity sinks into the cups filling them partly full. Ice cream is then spread on the bottom filler plate and fills the cylinders. These cylinders will extend only to the position in the cups filled with ice cream by the upper filler plate. Thus during the period of filling the tubes in the lower plate, there is no discharge of ice cream into the cups until the plate is removed.

By varying the length of the filling tubes and the diameter of the filling apertures and using a plurality of filling plates in combination, cups may be filled with any desired quantity of proportionate mixture of products. Also the tubes may be of any other shape and the cups any desired form of container.

We have described but one use of the device in connection with its operation in filling cups with ice cream, but it should have further application in the arts which will be apparent to those skilled therein.

For filling glasses with jelly or the like, where the material filled is a liquid, it improves the seal between the bottom of the tubes and the glass to surround the bottom of the seal with a resilient collar 12 of rubber or the like, which is illustrated in dotted lines on several of the filling tubes in Figure 1.

Having thus described our invention, what we claim as new and desire to secure by Letters Patent, is:—

1. In a device of the character described, a support for cups, a plate to extend across said support having a plurality of holes therein, tubes depending from the holes in said plate, said tubes arranged to enter cups set on the support, and an auxiliary removable plate having a plurality of holes therein, and having tubes extending therefrom, said tubes having such dimensions as will enable them to telescope within the tubes of the first mentioned plate, and extend to the bottoms of cups to be filled, said last named tubes forming measured quantity filling units for a bottom layer of material, and the first named tubes of such length as to extend part way into cups to be filled thereby forming measured quantity filling units for upper layers with said cups.

2. In a filling device, a container for retaining a plurality of empty packages to be filled, and a plurality of removable plates each having tubes extending from apertures in the plates, the tubes of one plate adapted to telescope within the tubes of another plate, the inner tubes being of such length as to extend to the bottoms of the packages to be filled, and the outer tubes shorter than the inner tubes so as to extend to the fill level in the packages caused by the discharge of the contents of the inner tubes.

EDWARD A. MENNINGER.
WALTER R. THOMPSON.